United States Patent
Meissner et al.

(10) Patent No.: US 9,074,945 B2
(45) Date of Patent: Jul. 7, 2015

(54) MEASURING INSERT FOR TEMPERATURE MEASUREMENT

(75) Inventors: Wilfried Meissner, Pfronten (DE); Helmut Kalteis, Marktoberdorf (DE); Peter Seefeld, Pfronten (DE)

(73) Assignee: ENDRESS + HAUSER WETZER GMBH + CO. KG, Nesselwang (DE)

( * ) Notice: Subject to any disclaimer, the term of this patent is extended or adjusted under 35 U.S.C. 154(b) by 331 days.

(21) Appl. No.: 13/516,009

(22) PCT Filed: Nov. 9, 2010

(86) PCT No.: PCT/EP2010/067148
§ 371 (c)(1),
(2), (4) Date: Jun. 14, 2012

(87) PCT Pub. No.: WO2011/072957
PCT Pub. Date: Jun. 23, 2011

(65) Prior Publication Data
US 2012/0250725 A1    Oct. 4, 2012

(30) Foreign Application Priority Data

Dec. 16, 2009   (DE) .......................... 10 2009 054 747

(51) Int. Cl.
*G01K 1/08*    (2006.01)
*G01K 1/10*    (2006.01)

(52) U.S. Cl.
CPC ........................................ *G01K 1/10* (2013.01)

(58) Field of Classification Search
CPC ..... G01N 25/48; G01N 27/048; G01R 1/071; C23C 16/463
USPC ............... 374/100, 44, 102–106, 16, 28, 158, 374/209, 141, 208, 159; 116/216; 73/73
See application file for complete search history.

(56) References Cited

U.S. PATENT DOCUMENTS 3,620,677 A * 11/1971 Morison ................... 422/423
3,771,364 A * 11/1973 Worthington ............. 374/109

(Continued)

FOREIGN PATENT DOCUMENTS

DE   102004053460 A1   5/2006
DE   102007036693 A1   2/2009

(Continued)

OTHER PUBLICATIONS

German Search Report in corresponding German Application No. 10 2009054747.9, dated Sep. 2, 2010.

(Continued)

*Primary Examiner* — Gail Kaplan Verbitsky
(74) *Attorney, Agent, or Firm* — Bacon & Thomas, PLLC

(57) ABSTRACT

A temperature measuring insert composed of ceramic or sintered materials of magnesium oxide or aluminum oxide accomodates, on its end facing the measured medium, temperature sensor elements, such as thermocouples and temperature measuring resistors, as a measuring tip, installable singly or with others in metal or ceramic protective tubes. The site of the measuring tip, a water adsorption behavior differing from the remaining measuring insert material is present, in order to protect the temperature sensor elements in the case of rapid process related temperature changes, in order to prevent, in the case of heating, effects due to superheated steam. A solution is provided by features including that the measuring insert has a jacketing comprising densified desiccant coatings, which have a gradient with a continuously or stepwise adapted water adsorptive behavior in the direction of the temperature sensor element, wherein, for example, a decreasing water adsorption is realized according to the invention by means of different fractions of modified and unmodified adsorbents as well as hydrophobic, super hydrophobic or hydrophobized ceramic parts.

19 Claims, 3 Drawing Sheets

(56) References Cited

U.S. PATENT DOCUMENTS

| | | | |
|---|---|---|---|
| 3,826,141 A * | 7/1974 | Pickett et al. | 374/160 |
| 3,895,523 A * | 7/1975 | Nollen | 374/162 |
| 4,057,029 A * | 11/1977 | Seiter | 374/106 |
| 4,408,557 A * | 10/1983 | Bradley et al. | 116/206 |
| 5,267,794 A * | 12/1993 | Holzer | 374/160 |
| 6,341,892 B1 | 1/2002 | Schmermund | |
| 6,378,454 B1 * | 4/2002 | Massi | 116/219 |
| 6,968,804 B1 * | 11/2005 | Barbieri et al. | 116/219 |
| 6,973,894 B1 * | 12/2005 | Adamy et al. | 116/206 |
| 7,114,848 B2 * | 10/2006 | Kaneko | 374/142 |
| 7,232,253 B2 * | 6/2007 | Isbitsky et al. | 368/89 |
| 7,234,860 B2 * | 6/2007 | Jensen et al. | 374/28 |
| 8,220,998 B2 * | 7/2012 | Winterhalter | 384/114 |
| 2004/0240324 A1 * | 12/2004 | Isbitsky et al. | 368/327 |
| 2005/0152431 A1 * | 7/2005 | Jensen et al. | 374/16 |
| 2007/0024414 A1 | 2/2007 | Beckmeyer et al. | |
| 2007/0242728 A1 | 10/2007 | Althofer et al. | |
| 2009/0034584 A1 | 2/2009 | Ehinger et al. | |
| 2010/0054299 A1 * | 3/2010 | Werner et al. | 374/28 |
| 2011/0038392 A1 * | 2/2011 | Ando et al. | 374/16 |
| 2013/0039380 A1 * | 2/2013 | Werner et al. | 374/28 |

FOREIGN PATENT DOCUMENTS

| | | | |
|---|---|---|---|
| EP | 1186870 A1 | | 3/2002 |
| JP | 55104730 A | * | 8/1980 |
| JP | 61231422 A | * | 10/1986 |
| JP | 63-184030 A | | 7/1988 |
| JP | 01316669 A | * | 12/1989 |
| JP | 2003-4539 A | | 1/2003 |
| JP | 2006-349612 A | | 12/2006 |
| JP | 2007-121137 A | | 5/2007 |

OTHER PUBLICATIONS

International Search Report in corresponding PCT Application No. PCT/EP2010/067148, dated Feb. 22, 2011.

International Preliminary Report on Patentability and Written Opinion in corresponding PCT Application No. PCT/EP2010/067148, dated Jul. 12, 2012.

* cited by examiner

MEASURING INSERT FOR TEMPERATURE MEASUREMENT

TECHNICAL FIELD

The invention relates to a measuring insert serving for temperature measurement and comprising a ceramic, or a magnesium oxide or an aluminum oxide, sintered material, wherein its end facing the measured medium accommodates temperature sensors at a measuring tip. Examples of temperature sensors include thermocouples, and temperature measuring resistors composed of a wire helix or a thin film.

BACKGROUND DISCUSSION

Such measuring inserts are known, for example, from Offenlegungsschrift DE 102007036693 A1.

Individual or multiple measuring inserts are inserted in metal or ceramic protective tubes, which, as medium contacting jackets, are exposed to process related, sometimes drastic, temperature changes, wherein moisture adsorptively bound to the ceramic sintered material can be released upon sudden temperature increase, this having disadvantageous effects directly on the temperature sensor element, which leads to the formation of condensate, which can result in corrosion phenomena in the protective tube.

According to the state of the art, for the manufacture of temperature measuring inserts, usually prefabricated small tube stock pieces composed of magnesia (MgO) or aluminum oxide, semi-finished parts are equipped with temperature sensors and lead wires and inserted in metal sleeves, wherein a sealing action is usually not achieved and disadvantageous condensation can affect the total inner space including the sensor leads, depending on warehouse conditions and humidity.

The adsorptive behavior of water on molecular sieves such as zeolites or silica gels can be characterized by the curve of the appropriate adsorption isotherm, wherein the amount of the adsorbate on the adsorbent can be presented, for example, as a function of the partial pressure at constant temperature.

The adsorption of water on pore forming phases, such as aluminum oxide, $Al_2O_3$, or similarly structured metal oxides, can lead to multilayered buildup, wherein the adsorption isotherms, with increasing steam partial pressure, first experience a flattening of the buildup, before rising greatly again upon the formation of subsequent layers, followed at still higher partial pressures by condensate formation.

A tightly bound $H_2O$ monolayer on an $Al_2O_3$ surface can have a very high adsorption enthalpy and, as a result, can only be removed by means of high temperature or high temperature vacuum treatments.

The temperature dependence of steam partial pressure, in the case of pressed ceramic parts of the type which can be present in a measuring insert, can be shown by adsorption isosteres; an adsorption isostere for steam shows steam partial pressure at constant volume rising exponentially as a function of temperature.

Ceramic materials, such as aluminum oxide or comparable metal oxides, which, depending on pretreatment, can be open pored and have open pored adsorption locations, only require moderate desorption enthalpies for weakly adsorbed water molecules in order to transfer the water back into the gaseous phase, wherein, in the case of the presence of supplementally present condensates, only the evaporation enthalpy is to be applied.

Thus, in the case of usual process related heating, a marked steam partial pressure can occur in the immediate vicinity of ceramic materials containing adsorbed moisture.

Moisture present can significantly influence the correct functioning of sensor elements; respectively, subsequent condensate formation following cooling can, for example, contribute to irreversible corrosion effects on temperature sensors or their leads.

SUMMARY OF THE INVENTION

An object of the present invention, consequently, is to provide a measuring insert, which overcomes the described disadvantages of the state of the art.

According to the invention, the object is achieved by features including that the measuring insert has functionalized surface areas adjoining one another, wherein the adsorptive behaviors of a liquid on these surface areas differ from one another. In this way, the disadvantageous influence of moisture, as steam or condensate, on the thermometer, for example, after rapid process related temperature changes can be avoided. In given cases, moisture forming on the surface of the measuring insert can be diverted by the application of functionalized surfaces, which differ in regard to their adsorptive behaviors.

In an embodiment of the measuring insert, the functionalized surface areas serve to conduct a liquid from a surface area of the measuring insert toward a surface area having a higher affinity as regards the adsorption of the liquid. For such purpose, for example, specific materials or a specific sequence of functionalized surface areas, i.e. a specific arrangement, can be applied.

In an additional embodiment, the measuring insert has a measuring tip, which is in thermal contact with a measured material during a measurement operation.

In an additional embodiment, the measuring tip has a functionalized surface area, which, in comparison with at least one other surface area of the measuring insert, has the smallest affinity as regards adsorption of the liquid. In this way, it can be assured that, in the area of the measuring tip, no damage is done due to a deposition of moisture.

In an additional embodiment, the affinity for adsorption of the liquid on the surface of the measuring insert increases with increasing distance from the measuring tip. In this arrangement it is advantageous, that, through the proposed distribution of the adsorptive behavior, depositing moisture, i.e. liquid, is led, for example, as far as possible away from the measuring tip.

In an additional embodiment, the change of the adsorptive behavior between the functionalized surface areas is stepwise. The functionalized surface areas can thus be so arranged that the adsorptive behavior changes abruptly at a transition between surface areas.

In an additional embodiment, the adsorptive behavior between the functionalized surface areas changes continuously. I.e., the adsorptive behavior can continuously change as a function of the position on the surface of the measuring tip, for example, with increasing distance from the measuring tip.

In an additional embodiment of the measuring insert, in the area of the measuring tip, there is a temperature sensor, which serves for registering the temperature of a measured material and which is at least partially embedded in the measuring insert.

In an additional embodiment, the temperature sensor is connected to the conductors of a sheathed cable, wherein the measuring tip, respectively the temperature sensor at least partially embedded therein, seals the sheathed cable on an end, and the surface of the sheathed cable in the region of the measuring tip and the functionalized surface areas of the adjoining surface of the sheathed cable differ from one another by having different adsorptive behaviors. In such case, it can be sufficient that only a part of the total surface of the measuring insert has, functionalized surface areas.

In an additional embodiment of the measuring insert, the functionalized surface areas having different adsorptive behavior comprise different parts, especially modified or unmodified water adsorbers and/or a hydrophobic, super hydrophobic or hydrophobized ceramic.

In an additional embodiment, the surface of the measuring insert has a coating having a uniform coating thickness, especially with a coating thickness of 0.2 to 5 mm, wherein the coating, in the direction toward the temperature sensor, has a gradient with decreasing water adsorption. The measuring insert can have, for example, a jacketing comprising densified, compressed, desiccant coatings, which, toward the temperature sensor element, have a gradient having continuously or stepwise adapted, water adsorptive behavior, wherein, for example, a decreasing water adsorption is realized by means of different fractions of modified and unmodified adsorbents as well as hydrophobic, super hydrophobic or hydrophobized ceramic parts. The functionalized surface areas can be formed by this jacketing, for example.

In an additional embodiment, the adsorptive behavior of the functionalized surfaces is influenced by means of water adsorbers, wherein the water adsorbers have different adsorption capacities, or different adsorption isotherms.

In an additional embodiment, the adsorptive behavior of the functionalized surface areas is influenced by means of a hydrophobic, super hydrophobic and/or hydrophobized ceramic.

In an additional embodiment, the coating comprises water adsorbers having a uniform adsorption capacity as well as a uniform adsorption isotherm and has a coating thickness, which becomes thinner toward the measuring tip, in which the sensor element is embedded.

The measuring insert can have, for example, a jacketing comprising densified desiccant coatings, which, toward the temperature sensor, which is arranged in the area of the measuring tip, have a gradient with a continuously or stepwise adapted water adsorptive behavior, wherein different fractions of modified and unmodified adsorbents as well as hydrophobic, super hydrophobic or hydrophobized ceramic parts can be applied, in order to reduce the water adsorbtion affinity.

According to an embodiment of the invention, in the immediate vicinity of the temperature sensor and the connection lines, coatings having uniform coating thicknesses of 0.2 to 5 mm are applied, wherein the adsorbents applied therefor have a gradient. The layer segment directly surrounding the temperature sensor element, consequently, does not tend to enable multilayer adsorption and does not have a high adsorption capacity and borders, depending on the arrangement, in each case, on coating zones, which accommodate excess steam from the sensor zone by means of diffusion processes in the direction of the coating having higher moisture affinity.

An embodiment provides that the coating has a stepped gradient. Another embodiment provides that the coating has a continuous gradient.

In an additional embodiment, the measuring insert has a coating, which has a gradient formed by means of water adsorbents, which have different adsorption capacities, or different adsorption isotherms.

Another embodiment provides that, as water adsorber, partially modified and unmodified 4 Angstrom to 8 Angstrom molecular sieve material in a mixing ratio from 80:1 to 2:1 is applied as jacket material.

Another embodiment provides that, as water adsorber, zeolites having different adsorption capacities, or different adsorption isotherms, are applied in different mixing ratios as jacket material.

An additional embodiment provides that, as water adsorbing desiccant, compressed magnesium oxides and unmodified 4 Angstrom to 8 Angstrom molecular sieve material in a mixing ratio from 70:1 to 3:1 are applied as jacket material.

In an additional embodiment, the coating zone, which borders the sensor element in its immediate vicinity and surrounds such, has, in addition to the adsorbents having the lowest adsorption capacity, supplements of hydrophobic, super hydrophobic and hydrophobized ceramic parts, wherein the water collecting affinity is markedly reduced.

In an additional embodiment, the measuring insert has a coating, which comprises water adsorbers having a uniform adsorption capacity as well as a uniform adsorption isotherm, and a coating thickness, which becomes thinner toward the sensor element.

In an additional embodiment, the jacketing comprises water adsorbers, which have a coating thickness that becomes thinner in the direction toward the sensor element, wherein the coating supplementally has a gradient with decreasing water adsorption in the direction toward the sensor element.

An embodiment provides that the coating, whose coating thickness becomes thinner in the direction toward the sensor element, supplementally has a stepped gradient.

An embodiment provides that the coating, whose coating thickness becomes thinner in the direction toward the sensor element, supplementally has a continuous gradient.

In an additional embodiment, the jacketing of the measuring insert has a rectangularly prismatic, polygonally prismatic, cylindrical or conical form.

BRIEF DESCRIPTION OF THE DRAWINGS

The invention will now be explained in greater detail based on the appended drawings, the figures of which show as follows.

DETAILED DISCUSSION IN CONJUNCTION WITH THE DRAWINGS

Figure 1:
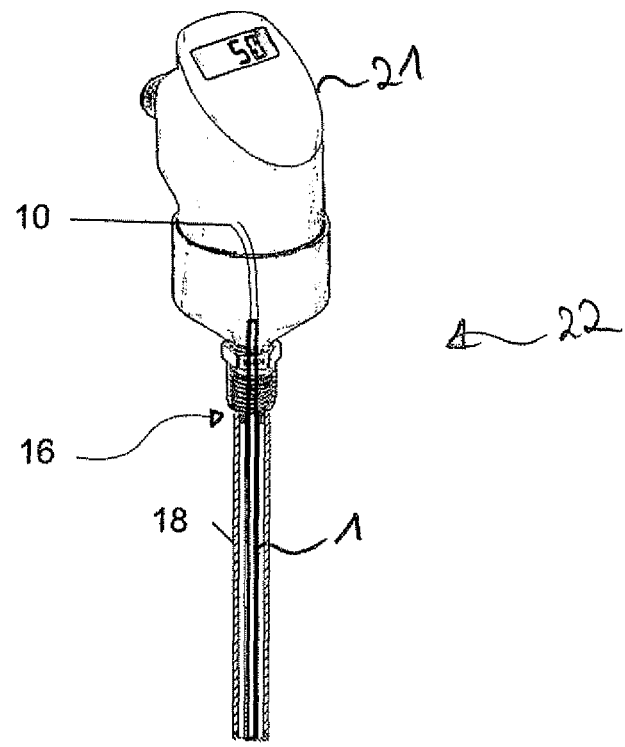
FIG. 1 is a compact thermometer for application in a process.

FIG. 1 shows a so called compact thermometer 22 comprising: a metal protective tube 18, for example, of a steel alloy such as 316 L or Inconel; and a measuring insert 1 fitted within the protective tube. A so called head transmitter 21, i.e. a measurement transmitter, which serves for processing the measuring signals recorded by means of the measuring insert, is connected to measuring insert 1.

Figure 2:
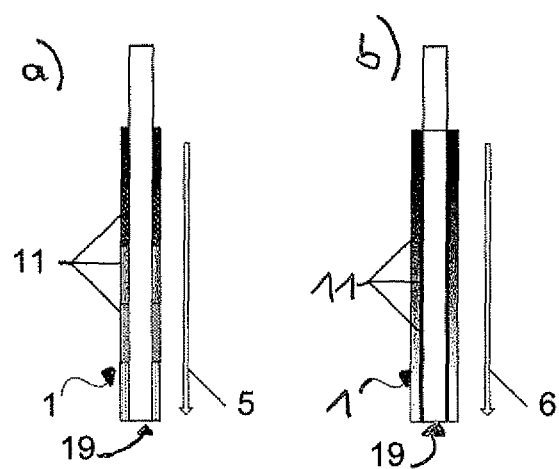
FIG. 2 is a schematic representation of a section through the longitudinal axis of an embodiment of a measuring insert having a stepped change of adsorptive behavior in FIG. 2a) and a continuous change in FIG. 2b)

FIG. 2 shows schematic representations of sections through different embodiments of measuring insert 1. FIG. 2 *a*) shows a measuring insert 1 having coatings 11 of approximately uniform coating thickness, for example, a coating thickness from 0.2 to 5 mm, which has a stepped gradient 5 exhibiting a decreasing water adsorption capacity. FIG. 2 *b*) shows measuring insert 1, which likewise has an approximately uniform coating thickness coupled, in this case, with a continuous gradient 6 exhibiting a decreasing water adsorption capacity.

Figure 3:
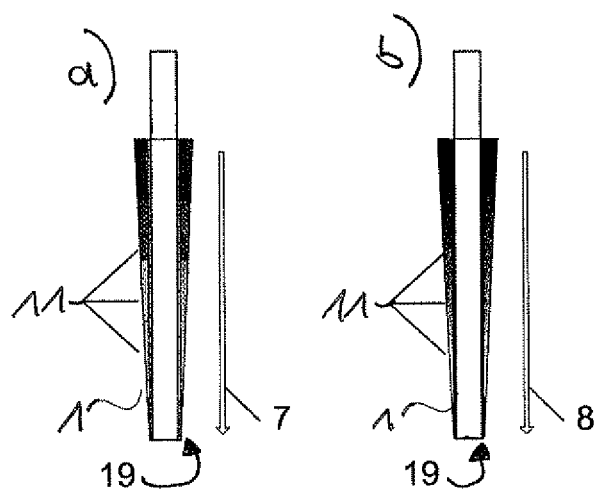
FIG. 3 is a schematic representation of a section through the longitudinal axis of an additional embodiment of a measuring insert having a stepped change of adsorptive behavior in FIG. 3a) and a continuous change in FIG. 3b)

FIG. 3 *a*) shows a cross section of measuring insert 1 having a coating thickness, which becomes thinner in the direction toward the temperature sensor located at the tip of the measuring insert 1, wherein coating 11 supplementally has a stepped gradient 7 exhibiting a decreasing water adsorption in the direction toward the temperature sensor. FIG. 3 *b*) shows measuring insert 1 having a coating thickness, which becomes thinner, wherein the coating supplementally has a continuous gradient 8 exhibiting a decreasing water adsorption capacity.

Figure 4:
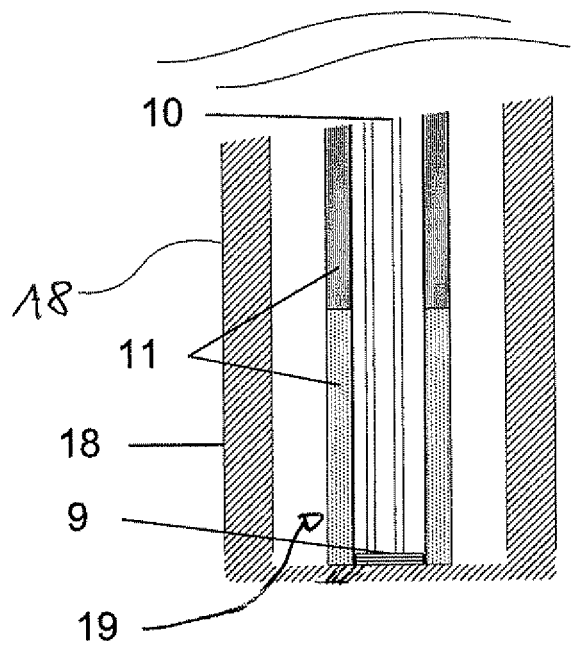
FIG. 4 is a schematic representation of a protective jacket equipped with a measuring insert.

FIG. 4 shows in cross section the lower segment of a protective tube 18 containing a measuring insert 1. During measurement operation, this segment contacts the measured material. Protective tube 18 comprises a metal alloy. Temperature sensor 9 of the measuring insert 1 is in thermal contact with the end of the protective tube. Furthermore, FIG. 4 shows how temperature sensor 9, which is contacted with the electrical leads 10, is surrounded by a part of coating 11, which has, for example, the lowest adsorption capacity. Coating 11 has a stepped water adsorption gradient. In an additional embodiment of the invention, the part of coating 11 surrounding temperature sensor 9 is surrounded by hydrophobic, super hydrophobic or hydrophobized ceramic parts, in order to further reduce the water collecting affinity.

Figure 5:
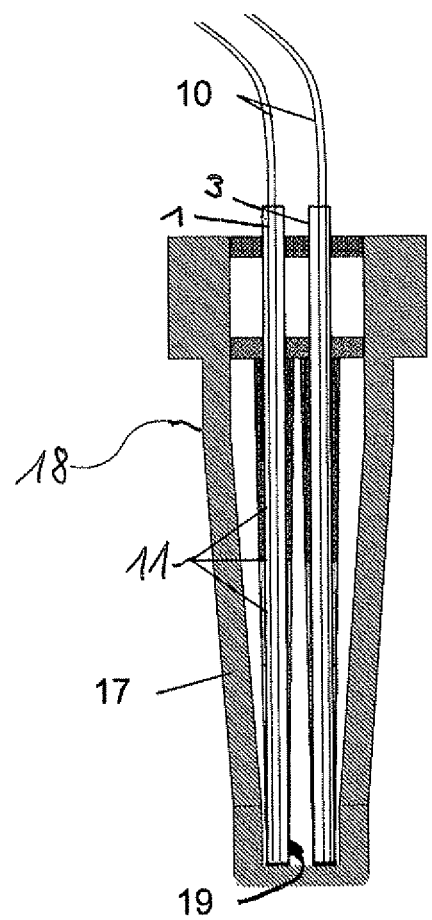
FIG. 5 is a schematic representation of a section through a protective tube equipped with two measuring inserts.

FIG. 5 shows a cross section of a ceramic protective tube 17 equipped with two measuring inserts 1, 3, wherein the measuring inserts 1, 3, have coatings 11 with coating thicknesses that become thinner and supplementally a stepped gradient 7 with a decreasing water adsorption in the direction toward the temperature sensor. The jacketed lower coating segment of coatings 11 in immediate contact with temperature sensor 9 has, for example, a low water adsorption capacity and, in an additional embodiment, has hydrophobic, super hydrophobic or hydrophobized ceramic parts, with which the water collecting affinity is reduced directly at the temperature sensor 9.

The invention claimed is:

1. A measuring insert for a thermometer having a protective jacket, said measuring insert comprising:
   a temperature sensor, which serves for registering the temperature of a measured measuring material and which is at least partially embedded in the measuring insert, wherein:
   the measuring insert has functionalized surface areas adjoining one another, wherein:
   adsorptive behaviors of a liquid on said functionalized surface areas differ from one another;
   wherein the measuring insert has a measuring tip, which is in thermal contact with the measuring material during measurement operation; and
   wherein said measuring tip has a functionalized surface area, which, in comparison with at least one other surface area of the measuring insert, has the lowest affinity as regards the adsorption of liquid.

2. The measuring insert as claimed in claim 1, wherein:
   said functionalized surface areas serve to conduct a liquid from a surface area of the measuring insert toward a surface area of the measuring insert having a higher affinity as regards the adsorption of the liquid.

3. The measuring insert as claimed in claim 1, wherein:
   an affinity for adsorption of liquid on the functionalized surface areas of the measuring insert increases with increasing distance from said measuring tip.

4. The measuring insert as claimed in claim 1, the change of the adsorptive behavior between the functionalized surface areas is stepwise.

5. The measuring insert as claimed in claim 1, wherein:
   the change of the adsorptive behavior between said functionalized surface areas is continuous.

6. The measuring insert as claimed in claim 1, wherein:
   a temperature sensor is connected to conductors of a sheathed cable;
   said temperature sensor at least partially embedded therein, seals the sheathed cable at one end; and
   the surface of the sheathed cable in the area of said measuring tip and said functionalized surface areas of the adjoining surface of the sheathed cable have adsorptive behaviors, which differ from one another.

7. The measuring insert as claimed in claim 1, wherein:
   said functionalized surface areas having different adsorptive behaviors comprise different parts.

8. The measuring insert as claimed in claim 1, wherein:
   the surface of the measuring insert has a coating with a uniform coating thickness; and
   the coating has a gradient with decreasing liquid adsorption in the direction toward the temperature sensor.

9. The measuring insert as claimed in claim 1, wherein:
   the adsorptive behavior of the functionalized surfaces is influenced by means of water adsorbers; and
   the water adsorbers have different adsorption capacities or different adsorption isotherms.

10. The measuring insert as claimed in claim 1, wherein:
    the adsorptive behavior of said functionalized surfaces is influenced by a hydrophobic, super hydrophobic and/or hydrophobized ceramic.

11. The measuring insert as claimed in claim 1, wherein said measuring insert has a coating,
    said coating comprises water adsorbers having a uniform adsorption capacity as well as a uniform adsorption isotherm and has a coating thickness, which becomes thinner toward a temperature sensor of the measuring insert.

12. The measuring insert as claimed in claim 7, wherein:
    said different absorptive behaviors comprise modified or unmodified water adsorbers and/or a hydrophobic, super hydrophobic or hydrophobized ceramic.

13. The measuring insert as claimed in claim 8, wherein:
    said uniform coating thickness amounts to 0.2 to 5 mm.

14. A measuring insert for a thermometer having a protective jacket, said measuring insert comprising:
    a temperature sensor, which serves for registering the temperature of a measured measuring material and which is at least partially embedded in the measuring insert, wherein:
    the measuring insert has functionalized surface areas adjoining one another, wherein:
    adsorptive behaviors of a liquid on said functionalized surface areas differ from one another;
    wherein the measuring insert has a measuring tip, which is in thermal contact with the measuring material during measurement operation; and wherein an affinity for adsorption of liquid on the functionalized surface areas of the measuring insert increases with increasing distance from said measuring tip.

15. A measuring insert for a thermometer having a protective jacket, said measuring insert comprising:
  a temperature sensor, which serves for registering the temperature of a measured measuring material and which is at least partially embedded in the measuring insert, wherein:
  the measuring insert has functionalized surface areas adjoining one another, wherein:
  adsorptive behaviors of a liquid on said functionalized surface areas differ from one another;
  wherein the change of the adsorptive behavior between the functionalized surface areas is stepwise.

16. A measuring insert for a thermometer having a protective jacket, said measuring insert comprising:
  a temperature sensor, which serves for registering the temperature of a measured measuring material and which is at least partially embedded in the measuring insert, wherein:
  the measuring insert has functionalized surface areas adjoining one another, wherein:
  adsorptive behaviors of a liquid on said functionalized surface areas differ from one another;
  wherein the change of the adsorptive behavior between said functionalized surface areas is continuous.

17. A measuring insert for a thermometer having a protective jacket, said measuring insert comprising:
  a temperature sensor, which serves for registering the temperature of a measured measuring material and which is at least partially embedded in the measuring insert, wherein:
  the measuring insert has functionalized surface areas adjoining one another, wherein:
  adsorptive behaviors of a liquid on said functionalized surface areas differ from one another;
  wherein a temperature sensor is connected to conductors of a sheathed cable;
  said temperature sensor at least partially embedded therein, seals the sheathed cable at one end; and
  the surface of the sheathed cable in the area of said measuring tip and said functionalized surface areas of the adjoining surface of the sheathed cable have adsorptive behaviors, which differ from one another.

18. A measuring insert for a thermometer having a protective jacket, said measuring insert comprising:
  a temperature sensor, which serves for registering the temperature of a measured measuring material and which is at least partially embedded in the measuring insert, wherein:
  the measuring insert has functionalized surface areas adjoining one another, wherein:
  adsorptive behaviors of a liquid on said functionalized surface areas differ from one another;
  wherein said functionalized surface areas having different adsorptive behaviors comprise different parts.

19. A measuring insert for a thermometer having a protective jacket, said measuring insert comprising:
  a temperature sensor, which serves for registering the temperature of a measured measuring material and which is at least partially embedded in the measuring insert, wherein:
  the measuring insert has functionalized surface areas adjoining one another, wherein:
  adsorptive behaviors of a liquid on said functionalized surface areas differ from one another;
  wherein said measuring insert has a coating,
  said coating comprises water adsorbers having a uniform adsorption capacity as well as a uniform adsorption isotherm and has a coating thickness, which becomes thinner toward a temperature sensor of the measuring insert.

* * * * *